US012665274B2

(12) United States Patent
Kondo et al.

(10) Patent No.: US 12,665,274 B2
(45) Date of Patent: **\*Jun. 23, 2026**

(54) POWER STORAGE DEVICE INCLUDING POWER STORAGE CELLS HAVING A POSITIVE ELECTRODE, A NEGATIVE ELECTRODE, A SEPARATOR, AND AN ACCOMMODATION CHAMBER FOR A LIQUID ELECTROLYTE

(71) Applicant: KABUSHIKI KAISHA TOYOTA JIDOSHOKKI, Kariya (JP)

(72) Inventors: Yushi Kondo, Kariya (JP); Osamu Ohmori, Kariya (JP); Takeshi Katayama, Kariya (JP); Yusuke Yamashita, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 542 days.

This patent is subject to a terminal disclaimer.

(21) Appl. No.: 18/037,832

(22) PCT Filed: Nov. 19, 2021

(86) PCT No.: PCT/JP2021/042685
§ 371 (c)(1),
(2) Date: May 19, 2023

(87) PCT Pub. No.: WO2022/113912
PCT Pub. Date: Jun. 2, 2022

(65) Prior Publication Data
US 2023/0411812 A1     Dec. 21, 2023

(30) Foreign Application Priority Data
Nov. 24, 2020    (JP) ................................. 2020-194684

(51) Int. Cl.
*H01M 50/682*        (2021.01)
*H01M 4/13*          (2010.01)
                    (Continued)

(52) U.S. Cl.
CPC ........... *H01M 50/682* (2021.01); *H01M 4/13* (2013.01); *H01M 10/0525* (2013.01);
(Continued)

(58) Field of Classification Search
CPC .. H01M 50/682; H01M 50/278; H01M 50/51; H01M 50/204; H01M 10/613; H01M 10/653; H01M 10/0525; H01M 4/13
See application file for complete search history.

(56)                References Cited

U.S. PATENT DOCUMENTS

2002/0018930 A1*   2/2002  Hamano ............... H01M 50/46
                                                        429/185
2009/0035648 A1    2/2009  Kimura
2017/0098856 A1*   4/2017  Zhamu .................... H01M 4/60

FOREIGN PATENT DOCUMENTS

JP        2015-18707 A      1/2015
JP        2017-016825 A     1/2017
                (Continued)

OTHER PUBLICATIONS

International Search Report for PCT/JP2021/042685, dated Feb. 8, 2022.

*Primary Examiner* — Jimmy Vo
(74) *Attorney, Agent, or Firm* — Sughrue Mion, PLLC

(57)              ABSTRACT

A power storage device includes power storage cells that includes a positive electrode, a negative electrode, a separator, and an accommodation chamber accommodating a liquid electrolyte in a liquid-tight manner. The power storage device includes a cell stack in which the power storage cells are stacked in series. A side surface of the cell stack is (Continued)

covered with a seal portion made of a plastic. A terminal positive electrode current collector and a terminal negative electrode current collector located in the outermost layer of the cell stack are made of a high thermal conductivity material having a thermal conductivity greater than or equal to 100 W/(m·K). The power storage device includes a positive electrode cooling unit, which cools the terminal positive electrode current collector, and a negative electrode cooling unit, which cools the terminal negative electrode current collector. The liquid electrolyte contains an ester compound.

10 Claims, 3 Drawing Sheets

(51) Int. Cl.

| | | |
|---|---|---|
| *H01M 10/0525* | (2010.01) | |
| *H01M 10/0569* | (2010.01) | |
| *H01M 10/613* | (2014.01) | |
| *H01M 10/653* | (2014.01) | |
| *H01M 50/204* | (2021.01) | |
| *H01M 50/278* | (2021.01) | |
| *H01M 50/51* | (2021.01) | |
| *H01M 4/02* | (2006.01) | |

(52) U.S. Cl.
CPC ..... *H01M 10/0569* (2013.01); *H01M 10/613* (2015.04); *H01M 10/653* (2015.04); *H01M 50/204* (2021.01); *H01M 50/278* (2021.01); *H01M 50/51* (2021.01); *H01M 2004/021* (2013.01); *H01M 2300/0037* (2013.01)

(56) References Cited

FOREIGN PATENT DOCUMENTS

| | | | |
|---|---|---|---|
| JP | 2018-101489 A | | 6/2018 |
| JP | 2019212449 A | * | 12/2019 |

* cited by examiner

POWER STORAGE DEVICE INCLUDING POWER STORAGE CELLS HAVING A POSITIVE ELECTRODE, A NEGATIVE ELECTRODE, A SEPARATOR, AND AN ACCOMMODATION CHAMBER FOR A LIQUID ELECTROLYTE

CROSS REFERENCE TO RELATED APPLICATIONS

This application is a National Stage of International Application No. PCT/JP2021/042685 filed Nov. 19, 2021, claiming priority based on Japanese Patent Application No. 2020-194684 filed Nov. 24, 2020.

TECHNICAL FIELD

The present invention relates to a power storage device.

BACKGROUND ART

Patent Literature 1 discloses a flat type power storage device formed by stacking individually produced power storage cells in series. Each power storage cell includes a positive electrode, a negative electrode, and a separator. The positive electrode includes a positive electrode active material layer formed at a central portion of one surface of a positive electrode current collector made of plastic. The negative electrode includes a negative electrode active material layer formed at a central portion of one surface of a negative electrode current collector made of plastic. The negative electrode is disposed so that the negative electrode active material layer faces the positive electrode active material layer of the positive electrode. The separator is disposed between the positive electrode and the negative electrode.

Further, the power storage cell includes a seal portion made of a thermoplastic disposed between the positive electrode and the negative electrode and on the outer side of the positive electrode active material layer and the negative electrode active material layer. The seal portion maintains a gap between the positive electrode current collector and the negative electrode current collector to prevent a short circuit between the current collectors, and provides a liquid tight seal between the positive electrode current collector and the negative electrode current collector, thereby forming a sealed space for accommodating a liquid electrolyte between the positive electrode current collector and the negative electrode current collector.

CITATION LIST

Patent Literature

Patent Literature 1: Japanese Laid-Open Patent Publication No. 2017 16825

SUMMARY OF INVENTION

Technical Problem

As one of methods of increasing the energy density of a power storage device, a method of increasing the weight per unit area of an active material layer may be considered. In this case, the diffusion resistance of charge carriers such as lithium ions in the active material layer is increased. The inventors of the present invention have found that using a liquid electrolyte containing an ester compound to reduce viscosity suppresses the diffusion resistance of charge carriers in an active material layer.

However, since an ester compound has a low boiling point, there is a possibility that the ester compound contained in the liquid electrolyte is volatilized when the temperature in the power storage device rises due to influence of the heat of the outside air in a high-temperature environment. Therefore, a power storage device using a liquid electrolyte containing an ester compound has a problem in that it is easily affected by heat of outside air in a high-temperature environment.

Accordingly, it is an objective of the present invention to provide a power storage device that uses a liquid electrolyte containing an ester compound, and is unlikely to be affected by heat of outside air in a high-temperature environment.

Solution to Problem

To achieve the foregoing objective, a power storage device includes power storage cells. Each power storage cell includes a positive electrode, a negative electrode, a separator, and an accommodation chamber. In the positive electrode, a positive electrode active material layer is bonded to a first surface of a positive electrode current collector. In the negative electrode, a negative electrode active material layer is bonded to a first surface of a negative electrode current collector. The negative electrode active material layer is disposed to face the positive electrode active material layer of the positive electrode. The separator is disposed between the positive electrode active material layer and the negative electrode active material layer. The accommodation chamber is provided between the positive electrode and the negative electrode and accommodates a liquid electrolyte in a liquid-tight manner. The liquid electrolyte is a liquid electrolyte containing an ester compound. The power storage device incudes a cell stack in which the power storage cells are stacked in series. A side surface of the cell stack with respect to a stacking direction is covered with a covering portion made of a plastic. Each of the positive electrode current collector and the negative electrode current collector includes a terminal current collector located at an outermost layer of the cell stack. At least one of the terminal current collectors is made of a high thermal conductivity material having a thermal conductivity greater than or equal to 100 W/(m·K). The power storage device comprises a cooling unit that cools the terminal current collector made of the high thermal conductivity material.

The above-described configuration uses the liquid electrolyte that contains the ester compound to reduce viscosity. This increases the weight per unit area of the active material layer while suppressing an increase in the diffusion resistance of the charge carriers in the active material layer.

In addition, of the outer surfaces of the cell stack formed by stacking the power storage cells in series, the side surface in relation to the stacking direction is covered with the covering portion made of plastic. This suppresses heat transfer between the liquid electrolyte in the cell stack and the outside of the cell stack through the side surface of the cell stack, and limits a heat transfer portion with the outside on the outer surface of the cell stack to the terminal current collector located at the end face in the stacking direction. In addition, the terminal current collector is made of a high thermal conductivity material, and the cooling unit that cools the terminal current collector made of the high thermal conductivity material is provided.

Accordingly, when the power storage device is used in a high-temperature environment, the covering portion suppresses the transfer of heat of the outside air to the liquid electrolyte in the cell stack. Even if the temperature of the liquid electrolyte rises due to the influence of the heat of the outside air, the heat is released to the outside through the terminal current collector and the cooling unit, which are made of the high thermal conductivity material. This suppresses an excessive temperature rise of the liquid electrolyte. Accordingly, the power storage device is less likely to be affected by heat of the outside air. It is thus possible to continuously suppress an increase in the diffusion resistance of charge carriers in the active material layer due to the ester compound contained in the liquid electrolyte even in a high-temperature environment.

At least one of the following conditions is preferably met: a weight per unit area of the positive electrode active material layer is greater than or equal to 55 mg/cm², and a weight per unit area of the negative electrode active material layer is greater than or equal to 25 mg/cm².

The diffusion resistance of charge carriers such as lithium ions in the active material layer increases as the weight per unit area of the active material layer, which is one or both of the positive electrode active material layer and the negative electrode active material layer, increases. Therefore, when the weight per unit area of the active material layer is large as described above, the above-described advantage obtained by the liquid electrolyte containing the ester is more remarkable.

The separator is preferably bonded to the positive electrode active material layer and the negative electrode active material layer.

The above-described configuration increases the efficiency of heat conduction between the positive electrode active material layer and the negative electrode active material layer facing each other with the separator interposed between them. As a result, heat is readily transferred in the stacking direction of the cell stack, and the heat in the cell stack is efficiently transferred to the terminal current collector and the cooling unit and released to the outside.

Effects of the Invention

The present invention reduces the influence of the heat of outside air in a high-temperature environment.

DESCRIPTION OF EMBODIMENTS

An embodiment of the present invention will now be described with reference to the drawings.

Figure 1:
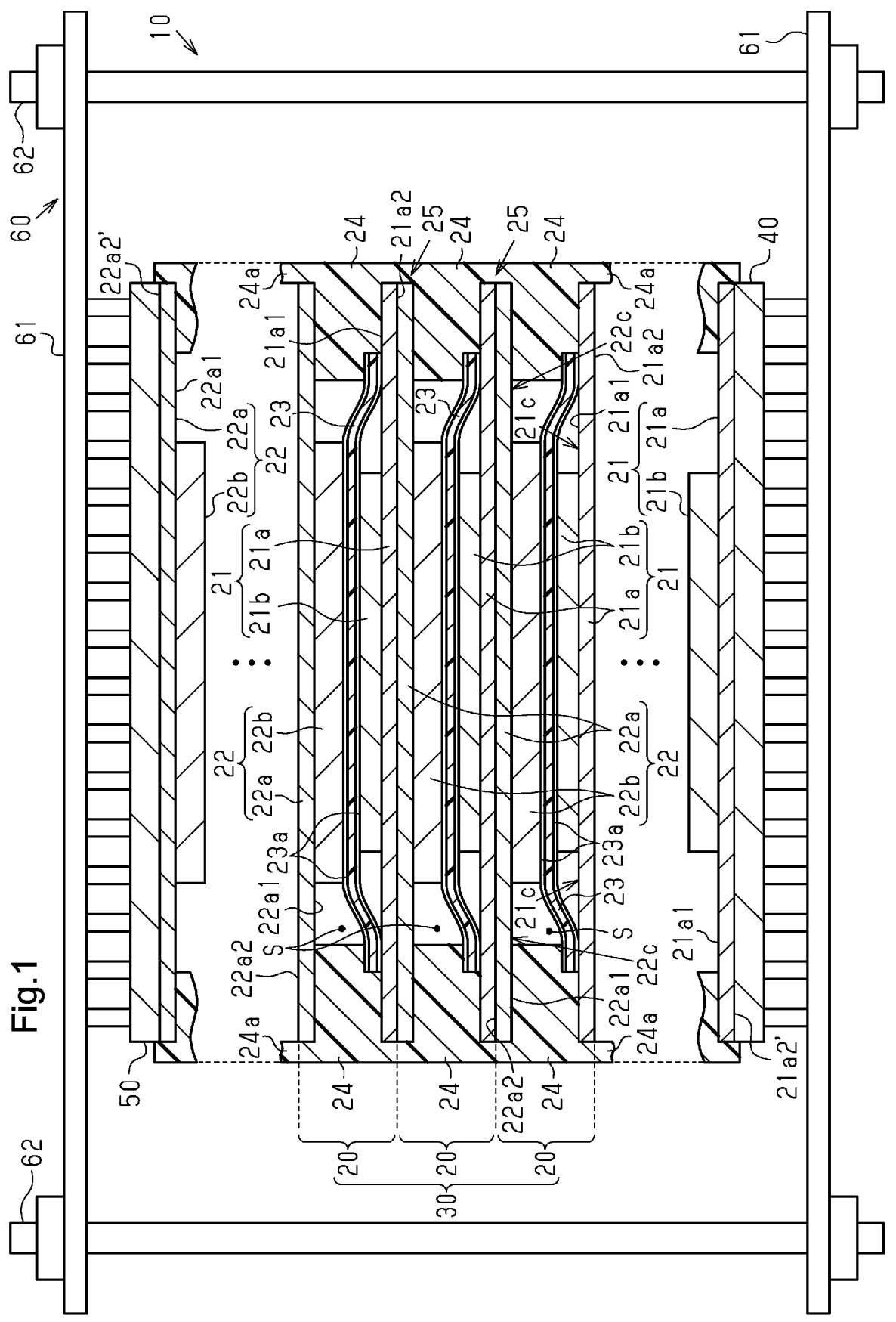
FIG. 1 is a cross-sectional view of a power storage device.

A power storage device 10 illustrated in FIG. 1 is a power storage module used for batteries of various vehicles such as a forklift, a hybrid electric vehicle, and a battery electric vehicle. The power storage device 10 is, for example, a rechargeable battery such as a lithium-ion rechargeable battery. The power storage device 10 may be an electric double-layer capacitor. In the present embodiment, a case in which the power storage device 10 is a lithium-ion rechargeable battery is illustrated.

As shown in FIG. 1, the power storage device 10 is configured to include a cell stack 30 (stack body) in which power storage cells 20 are stacked in a stacking direction. Hereinafter, the stacking direction of the power storage cells 20 will be simply referred to as the stacking direction. Each power storage cell 20 includes a positive electrode 21, a negative electrode 22, a separator 23, and a seal portion 24.

The positive electrode 21 includes a positive electrode current collector 21a and a positive electrode active material layer 21b, which is provided on a first surface 21a1 of the positive electrode current collector 21a. In plan view seen from the stacking direction (hereinafter, simply referred to as plan view), the positive electrode active material layer 21b is formed in a central portion of the first surface 21a1 of the positive electrode current collector 21a. A peripheral portion of the first surface 21a1 of the positive electrode current collector 21a in plan view is a positive electrode uncoated portion 21c, on which the positive electrode active material layer 21b is not provided. The positive electrode uncoated portion 21c is disposed to surround the periphery of the positive electrode active material layer 21b in plan view.

The negative electrode 22 includes a negative electrode current collector 22a and a negative electrode active material layer 22b provided on a first surface 22a1 of the negative electrode current collector 22a. In plan view, the negative electrode active material layer 22b is formed in a central portion of the first surface 22a1 of the negative electrode current collector 22a. A peripheral portion of the first surface 22a1 of the negative electrode current collector 22a in plan view is a negative electrode uncoated portion 22c, on which the negative electrode active material layer 22b is not provided. The negative electrode uncoated portion 22c is disposed to surround the periphery of the negative electrode active material layer 22b in plan view.

The positive electrode 21 and the negative electrode 22 are disposed such that the positive electrode active material layer 21b and the negative electrode active material layer 22b face each other in the stacking direction. That is, the direction in which the positive electrode 21 and the negative electrode 22 face each other agrees with the stacking direction. The negative electrode active material layer 22b is formed to be slightly larger than the positive electrode active material layer 21b, and the entire formation region of the positive electrode active material layer 21b is located within the formation region of the negative electrode active material layer 22b in plan view.

The positive electrode current collector 21a includes a second surface 21a2, which is a surface on the side opposite to the first surface 21a1. The positive electrode 21 has a monopolar structure, in which neither the positive electrode active material layer 21b nor the negative electrode active material layer 22b is formed on the second surface 21a2 of the positive electrode current collector 21a. The negative electrode current collector 22a includes a second surface 22a2, which is a surface on the side opposite to the first surface 22a1. The negative electrode 22 has a monopolar structure, in which neither the positive electrode active material layer 21b nor the negative electrode active material layer 22b is formed on the second surface 21a2 of the negative electrode current collector 22a.

The separator 23 is disposed between the positive electrode 21 and the negative electrode 22 and separates the positive electrode 21 and the negative electrode 22 from each other to prevent a short circuit due to contact between the electrodes 21, 22, while allowing charge carriers such as lithium ions to pass therethrough.

The separator 23 is, for example, a porous sheet or a nonwoven fabric containing a polymer that absorbs and retains a liquid electrolyte. Examples of the material forming the separator 23 include polypropylene, polyethylene, polyolefin, and polyester. The separator 23 may have a single-layer structure or a multilayer structure. The multilayer structure may include, for example, an adhesive layer, a ceramic layer as a heat-resistant layer, or the like.

As shown in FIG. 1, in the present embodiment, sheet-shaped separators 23 each having an adhesive layer 23a on either surface are used. The adhesive layer 23a provided on one of the surfaces (the lower surface in the drawing) of each separator 23 is bonded to the first surface 21a1 of the positive electrode current collector 21a and the positive electrode active material layer 21b. The adhesive layer 23a provided on the other surface (surfaces on the upper side in the drawing) of the separator 23 is bonded to the negative electrode active material layer 22b.

The seal portion 24 is disposed between the first surface 21a1 of the positive electrode current collector 21a of the positive electrode 21 and the first surface 22a1 of the negative electrode current collector 22a of the negative electrode 22, and on the outer side of the positive electrode active material layer 21b and the negative electrode active material layer 22b, and is bonded to both the positive electrode current collector 21a and the negative electrode current collector 22a. The seal portion 24 insulates the positive electrode current collector 21a and the negative electrode current collector 22a from each other to prevent a short circuit between the current collectors 21a, 22a.

In plan view, the seal portion 24 extends along the peripheral edge portions of the positive electrode current collector 21a and the negative electrode current collector 22a, and is formed in a frame shape surrounding the periphery of the positive electrode active material layer 21b and the negative electrode active material layer 22b. The seal portion 24 is disposed between the positive electrode uncoated portion 21c of the first surface 21a1 of the positive electrode current collector 21a and the negative electrode uncoated portion 22c of the first surface 22a1 of the negative electrode current collector 22a.

An accommodation chamber S, which is defined by the frame-shaped seal portion 24, the positive electrode 21, and the negative electrode 22 is formed inside the power storage cell 20. The accommodation chamber S is a liquid-tight sealed space surrounded by the frame-shaped seal portion 24, the positive electrode 21, and the negative electrode 22. The accommodation chamber S accommodates the positive electrode active material layer 21b, the negative electrode active material layer 22b, the separator 23, and liquid electrolyte. The peripheral portion of the separator 23 is embedded in the seal portion 24. The seal portion 24 provides a seal between the positive electrode 21 and the negative electrode 22, thereby suppressing permeation to the outside of the liquid electrolyte accommodated in the accommodation chamber S.

The cell stack 30 has a structure in which the power storage cells 20 are stacked such that the second surface 21a2 of the positive electrode current collector 21a and the second surface 22a2 of the negative electrode current collector 22a are in contact with each other. Thus, the power storage cells 20, which form the cell stack 30, are connected in series.

In the cell stack 30, two power storage cells 20 adjacent to each other in the stacking direction form a pseudo-bipolar electrode 25, in which the positive electrode current collector 21a and the negative electrode current collector 22a in contact with each other are regarded as one current collector. Each of the pseudo-bipolar electrodes 25 includes a current collector, which has a structure in which a positive electrode current collector 21a and a negative electrode current collector 22a are stacked, a positive electrode active material layer 21b, which is formed on one surface of the current collector, and a negative electrode active material layer 22b, which is formed on the other surface of the current collector.

The seal portion 24 of each power storage cell 20 includes an outer peripheral portion 24a, which extends outward beyond each edge portion of the positive electrode current collector 21a and the negative electrode current collector 22a. The outer peripheral portion 24a protrudes in a direction orthogonal to the stacking direction from each edge portion of the positive electrode current collector 21a and the negative electrode current collector 22a when viewed from the stacking direction. The power storage cells 20 adjacent to each other in the stacking direction are integrated by bonding the outer peripheral portions 24a of the seal portions 24 to each other.

Therefore, the peripheral surface of the cell stack 30, that is, the side surface in relation to the stacking direction is entirely covered with the seal portions 24. In the present embodiment, the seal portions 24 form a covering portion that covers the side surface of the cell stack 30 in relation to the stacking direction. Examples of the method of bonding the adjacent seal portions 24 to each other include known welding methods such as thermal welding, ultrasonic welding, and infrared welding.

With reference to FIG. 1, the positive electrode current collector 21a and the negative electrode current collector 22a located at the outermost layers in the stacking direction of the cell stack 30 are respectively referred to as a terminal positive electrode current collector 21a' and a terminal negative electrode current collector 22a' as terminal current collectors. A positive electrode cooling unit 40, which cools the terminal positive electrode current collector 21a', is attached to a second surface 21a2' of the terminal positive electrode current collector 21a'. A negative electrode cooling unit 50, which cools the terminal negative electrode current collector 22a', is attached to a second surface 22a2' of the terminal negative electrode current collector 22a'.

The positive electrode cooling unit 40 and the negative electrode cooling unit 50 cool the terminal positive electrode current collector 21a' to, for example, 60° C. or lower. Specific configurations of the positive electrode cooling unit 40 and the negative electrode cooling unit 50 are not particularly limited, and a known cooling unit used for cooling a power storage device can be used. Examples of the known cooling unit include a cooling unit that has a structure for increasing heat transfer efficiency, such as fins, and cools a cooling target by performing heat exchange with a cooling medium.

In the present embodiment, the positive electrode cooling unit 40 and the negative electrode cooling unit 50 are configured to also function as conductive plates. That is, the positive electrode cooling unit 40 and the negative electrode cooling unit 50 are made of a material having high thermal conductivity and electrical conductivity, and are electrically connected to the second surface 21a2' of the terminal positive electrode current collector 21a' and the second surface 22a2' of the terminal negative electrode current collector 22a', respectively. The power storage device 10 is charged and discharged through terminals provided in the positive electrode cooling unit 40 and the negative electrode cooling unit 50. As a material forming the positive electrode cooling unit 40 and the negative electrode cooling unit 50, it is possible to use, for example, the same material as a material forming a positive electrode current collector 21a and a negative electrode current collector 22a, which will be discussed below.

The power storage device 10 includes a binding member 60, which binds the cell stack 30. The binding member 60 applies a binding load to a region where the power storage cells 20 face each other in the stacking direction of the cell stack 30, in particular, a region where a range in which the positive electrode active material layer 21b is provided and a range in which the negative electrode active material layer 22b is provided overlap with each other in plan view.

The specific configuration of the binding member 60 is not particularly limited if the binding member 60 is configured to apply a binding load to the cell stack 30. FIG. 1 illustrates, as an example, the binding member 60, which includes plate-shaped binding plates 61 disposed at the opposite ends of the cell stack 30 in the stacking direction to sandwich the cell stack 30, and fastening members 62, which include bolts and nuts for fastening the binding plates 61 to each other. The fastening members 62 urge the binding plates 61 in a direction in which the binding plates 61 approach each other, whereby a binding load in the stacking direction is applied to the cell stack 30.

Next, details of the positive electrode current collector 21a, the negative electrode current collector 22a, the positive electrode active material layer 21b, the negative electrode active material layer 22b, the liquid electrolytes, and the seal portion 24 will be described.

<Positive Electrode Current Collector and Negative Electrode Current Collector>

The positive electrode current collector 21a and the negative electrode current collector 22a are chemically inert electric conductors for allowing current to continuously flow through the positive electrode active material layer 21b and the negative electrode active material layer 22b during discharging or charging of the lithium-ion rechargeable battery.

The material forming the terminal positive electrode current collector 21a' and the terminal negative electrode current collector 22a' is a high thermal conductivity material having a thermal conductivity of 100 W/(m·K) or more. Examples of the high thermal conductivity material include metal materials such as silver, copper, gold, and aluminum. The thermal conductivity of the high thermal conductivity material is, for example, 500 W/(m·K) or less.

From the viewpoint of heat conduction to the positive electrode cooling unit 40 and the negative electrode cooling unit 50, it is preferable that the terminal positive electrode current collector 21a' and the terminal negative electrode current collector 22a' have a large area in plan view (hereinafter, simply referred to as an area) and are thin.

From the above-mentioned viewpoint, the areas of the terminal positive electrode current collector 21a' and the terminal negative electrode current collector 22a' are, for example, greater than or equal to 1 m², and preferably greater than or equal to 1.3 m². The areas of the terminal positive electrode current collector 21a' and the terminal negative electrode current collector 22a' are, for example, 2.5 m 2 or less, and preferably 2.2 m 2 or less.

The thicknesses of the terminal positive electrode current collector 21a' and the terminal negative electrode current collector 22a' are, for example, 0.003 mm or more, preferably 0.005 mm or more, and more preferably 0.01 mm or more. The thicknesses of the terminal positive electrode current collector 21a' and the terminal negative electrode current collector 22a' are, for example, 0.06 mm or less, preferably 0.05 mm or less, and more preferably 0.04 mm or less.

As a material forming the positive electrode current collectors 21a other than the terminal positive electrode current collector 21a' (hereinafter referred to as general positive electrode current collectors) and the negative electrode current collectors 22a other than the terminal negative electrode current collector 22a' (hereinafter referred to as general negative electrode current collectors), for example, a metal material, a conductive plastic, a conductive inorganic material, or the like can be used.

Examples of the metal material include copper, aluminum, nickel, titanium, and stainless steels (for example, SUS304, SUS316, SUS301, and SUS304 specified in JIS G 4305: 2015). Examples of the conductive plastic include a plastic obtained by adding a conductive filler to a conductive polymer material or a non-conductive polymer material as necessary.

The thermal conductivities of the materials forming the general positive electrode current collectors and the general negative electrode current collectors are not particularly limited, but are preferably 100 W/(m·K) or more. In addition, the general positive electrode current collectors and the general negative electrode current collectors are also preferably made of a high thermal conductivity material.

From the viewpoint of heat conduction to the terminal positive electrode current collector 21a' and the terminal negative electrode current collector 22a', it is preferable that the general positive electrode current collectors and the general negative electrode current collectors have large areas and are thin.

From the above-mentioned viewpoint, the area of each of the general positive electrode current collectors and the general negative electrode current collectors is, for example, preferably 1 m 2 or more, and more preferably 1.3 m 2 or more. The area of each of the general positive electrode current collectors and the general negative electrode current collectors is, for example, preferably 2.5 m 2 or less, and more preferably 2.2 m 2 or less.

The thicknesses of the general positive electrode current collectors and the general negative electrode current collectors are, for example, preferably 0.003 mm or more, more preferably 0.005 mm or more, and still more preferably 0.01 mm or more. The thicknesses of the general positive electrode current collectors and the general negative electrode current collectors are, for example, preferably 0.06 mm or less, more preferably 0.05 mm or less, and still more preferably 0.04 mm or less.

The areas and thicknesses of the general positive electrode current collectors and the general negative electrode current collectors may be the same as those of the terminal positive electrode current collector 21a' and the terminal negative electrode current collector 22a'.

One or both of the positive electrode current collector 21a and the negative electrode current collector 22a may include multiple layers including one or more layers containing the above-described metal material or conductive plastic. The surfaces of one or both of the positive electrode current collector 21a and the negative electrode current collector 22a may be covered with a known protective layer. The surface of one or both of the positive electrode current collector 21a and the negative electrode current collector 22a may be subjected to surface treatment by a known method such as plating treatment. Examples of the surface treatment include chromate treatment and phosphoric acid chromate treatment.

The positive electrode current collector 21a and the negative electrode current collector 22a may each independently have the form of, for example, foils, sheets, films, wires, rods, meshes, clad materials, or the like. In the case of foils, sheets, or films, the thickness is, for example, from 1 to 100 pin.

In the positive electrode current collector 21a and the negative electrode current collector 22a of the present embodiment, the general positive electrode current collectors are made of aluminum foils, the terminal positive electrode current collector 21a' is made of aluminum foils, the general negative electrode current collector is made of a copper foil, and the terminal negative electrode current collector 22a' is made of a copper foil.

<Positive Electrode Active Material Layer and Negative Electrode Active Material Layer>

The positive electrode active material layer 21b contains a positive electrode active material capable of storing and releasing charge carriers such as lithium ions. As the positive electrode active material, a material that can be used as a positive electrode active material of a lithium-ion rechargeable battery, such as a lithium composite metal oxide having a layered rock-salt structure, a metal oxide having a spinel structure, or a polyanion-based compound, may be employed. Two or more kinds of positive electrode active materials may be used in combination. In the present embodiment, the positive electrode active material layer 21b contains olivine-type lithium iron phosphate (LiFePO$_4$) as a polyanionic compound.

The negative electrode active material layer 22b is not particularly limited if it is made of simple substances, alloys, or compounds capable of storing and releasing charge carriers such as lithium ions. Examples of the negative electrode active material include Li, carbon, a metal compound, or an element or a compound thereof that can be alloyed with lithium. Examples of the carbon include natural graphite, artificial graphite, hard carbon (non-graphitizable carbon), and soft carbon (graphitizable carbon). Examples of the artificial graphite include highly oriented graphite and mesocarbon microbeads. Examples of elements that can be alloyed with lithium include silicon and tin. In the present embodiment, the negative electrode active material layer 22b contains graphite as a carbon-based material.

Each of the positive electrode active material layer 21b and the negative electrode active material layer 22b (hereinafter, also simply referred to as an active material layer) may further contain a conductive aid for increasing electric conductivity, a binder, electrolytes (polymer matrices, ion-conductive polymers, liquid electrolytes, and the like), electrolyte-supporting salts (lithium salts) for increasing ionic conductance, and the like as necessary. The components contained in the active material layer and the compound ratio of the components are not particularly limited, and conventional knowledge about lithium-ion secondary batteries can be referred to as appropriate.

The conductive aid is added to increase the conductivity of the positive electrode 21 or the negative electrode 22. Examples of the conductive aid include acetylene black, carbon black, and graphite.

Examples of the binder include following: fluorine-containing plastics such as polyvinylidene fluoride, polytetrafluoroethylene, and fluorine rubber; thermoplastics such as polypropylene and polyethylene; imide plastics such as polyimide and polyamide-imide; alkoxysilyl group-containing plastics; acrylic plastics such as polyacrylic acid and methacrylic acid; styrene-butadiene rubber; carboxymethyl cellulose; alginates such as sodium alginate and ammonium alginate; water-soluble cellulose ester crosslinked products; and starch-acrylic acid graft polymers. These binders may be used alone or in combination. As the solvent or dispersion medium, for example, water, N-methyl-2-pyrrolidone or the like is used.

In order to form active material layers on the surfaces of the positive electrode current collector 21a and the negative electrode current collector 22a, a conventional method such as a roll coating method may be used.

In order to improve the thermal stability of the positive electrode 21 or the negative electrode 22, a heat-resistant layer may be provided on the surface of the active material layer.

The thickness and the weight per unit area of the active material layer are not particularly limited, and conventional knowledge about lithium-ion rechargeable batteries can be referred to as appropriate. However, from the viewpoint of increasing the energy density of the power storage cell 20, it is preferable to increase the weight per unit area of the active material layer.

To be specific, the thickness of the positive electrode active material layer 21b is, for example, 250 μm or more, and preferably 400 μm or more. The thickness of the positive electrode active material layer 21b is, for example, 600 μm or less. The weight per unit area of the positive electrode active material layer 21b is, for example, 55 mg/cm$^2$ or more, and preferably 70 mg/cm$^2$ or more. The weight per unit area of the positive electrode active material layer 21b is, for example, 90 mg/cm$^2$ or less. From the viewpoint of increasing the rigidity of the positive electrode 21, when the positive electrode current collector 21a has a foil-shape with a thickness of 0.015 to 0.05 mm, the weight per unit area of the positive electrode active material layer 21b is preferably from 55 to 90 mg/cm$^2$, and the density of the positive electrode active material layer 21b is preferably from 1.6 to 2.1 g/cm$^3$.

The thickness of the negative electrode active material layer 22b is, for example, 150 μm or more, preferably 200 μm or more, and more preferably 250 μm or more. The thickness of the negative electrode active material layer 22b is, for example, 400 μm or less. The weight per unit area of the negative electrode active material layer 22b is, for example, 25 mg/cm$^2$ or more, and preferably 30 mg/cm$^2$ or more. The weight per unit area of the negative electrode active material layer 22b is, for example, 45 mg/cm$^2$ or less. From the viewpoint of increasing the rigidity of the negative electrode 22, when the negative electrode current collector 22a has a foil-shape with a thickness of 0.005 to 0.02 mm, the weight per unit area of the negative electrode active material layer 22b is preferably from 25 to 45 mg/cm$^2$, and the density of the negative electrode active material layer 22b is preferably from 1.1 to 1.5 g/cm$^3$.

<Seal Portion (Covering Portion)>

The seal portion 24 is made of a polyolefin plastic. Examples of the polyolefin plastic include polyethylene (PE), polypropylene (PP), modified polyethylene (modified PE), modified polypropylene (modified PP), isoprene, modified isoprene, polybutene, modified polybutene, and polybutadiene. Examples of the modified polyethylene include acid-modified polyethylene and epoxy-modified polyethylene. Examples of the modified polypropylene include acid-modified polypropylene and epoxy-modified polypropylene. These known polyolefin plastics may be used in combination of two or more thereof. The polyolefin plastic may be a thermoplastic or a thermosetting plastic. The thermal conductivity of the seal portion 24 is, for example, from 0.17 to 0.19 W/(m·K).

<Liquid Electrolyte>

Examples of the liquid electrolyte include a liquid electrolyte containing a nonaqueous solvent and an electrolyte salt dissolved in the nonaqueous solvent. As the electrolyte salts, known lithium salts such as $LiClO_4$, $LiAsF_6$, $LiPF_6$, $LiBF_4$, $LiCF_3SO_3$, $LiN(FSO_2)_2$, and $LiN(CF_3SO_2)_2$ can be used. As the nonaqueous solvent, known solvents such as cyclic carbonates, cyclic esters, chain carbonates, chain esters, and ethers can be used. These known solvent materials may be used in combination of two or more thereof.

The liquid electrolyte contains an ester compound as a nonaqueous solvent. Examples of the ester compound include methyl acetate, ethyl acetate, and methyl propionate. Two or more kinds of the ester compounds may be used in combination. The problem of volatilization of the ester compound contained in the liquid electrolyte when the temperature in the power storage device 10 increases is more likely to occur as the boiling point of the ester compound is lowered, for example, when the boiling point is 90° C. or lower. The boiling point of methyl acetate is 57° C., the boiling point of ethyl acetate is 77.1° C., and the boiling point of methyl propionate is 80° C.

The ester compound is contained in the liquid electrolyte for the purpose of reducing the viscosity of the liquid electrolyte and improving the ionic conductance. The viscosity of the liquid electrolytes at 25° C., is, for example, preferably 7 mPa·s or less, more preferably 6 mPa·s or less. The viscosity of the liquid electrolytes at 25° C. is, for example, 0.8 mPa·s or more. The following equation holds 1 mPa·s=1 cP.

The ionic conductance of the liquid electrolytes at 25° C. is preferably, for example, 5 mS/cm or more. Examples of a preferable range of the ionic conductance include a range of 6 to 30 mS/cm, a range of 7 to 25 mS/cm, a range of 10 to 25 mS/cm, a range of 12 to 25 mS/cm, and a range of 13 to 20 mS/cm.

The ratio of the ester compound to the total nonaqueous solvent in the liquid electrolyte is, for example, preferably from 30 to 95% by volume, more preferably from 40 to 90% by volume, still more preferably from 50 to 89% by volume, particularly preferably from 60 to 88% by volume, and most preferably from 70 to 87% by volume.

The power storage device 10 is manufactured through an electrode forming step, a power storage cell forming step, and a cell stack forming step in that order. As an example, a case will be described in which all the positive electrode current collectors 21a, including the terminal positive electrode current collector 21a', are made of aluminum foils, and all the negative electrode current collectors 22a, including the terminal negative electrode current collector 22a', are made of copper foils.

<Electrode Forming Step>

The electrode forming step includes a positive electrode forming step of forming the positive electrode 21 and a negative electrode forming step of forming the negative electrode 22.

The positive electrode forming step is not particularly limited, and it is possible to use a known method of forming the positive electrode 21 including the positive electrode current collector 21a and the positive electrode active material layer 21b. For example, the positive electrode 21 can be formed by applying a positive electrode mixture, which becomes the positive electrode active material layer 21b when solidified, to the first surface 21a1 of an aluminum foil as the positive electrode current collector 21a so as to have a specified thickness, and then performing a solidifying process in accordance with the positive electrode mixture.

The negative electrode forming step is not particularly limited, and it is possible to use a known method of forming the negative electrode 22 including the negative electrode current collector 22a and the negative electrode active material layer 22b. For example, the negative electrode 22 can be formed by applying a negative electrode mixture, which becomes the negative electrode active material layer 22b when solidified, to the first surface 22a1 of a copper foil as the negative electrode current collector 22a so as to have a specified thickness, and then performing a solidifying process in accordance with the negative electrode mixture.

<Power Storage Cell Forming Step>

In the power storage cell forming step, first, the positive electrode 21 and the negative electrode 22 are arranged so that the positive electrode active material layer 21b and the negative electrode active material layer 22b are opposed to each other in the stacking direction with the separator 23 interposed therebetween. Also, a sealing material to be the seal portion 24, for example, a plastic sheet made of the low-density polyethylene is arranged between the positive electrode 21 and the negative electrode 22 and on the outer side of the positive electrode current collector 21a and the negative electrode current collector 22a.

Thereafter, the positive electrode 21, the negative electrode 22, and the separator 23 are bonded to the sealing material by welding, thereby forming an assembly in which the positive electrode 21, the negative electrode 22, the separator 23, and the seal portion 24 are integrated. Examples of the welding method of the sealing material include known welding methods such as thermal welding, ultrasonic welding, and infrared welding.

Next, the liquid electrolyte is injected into the accommodation chamber S inside the assembly through an injection port provided in a part of the seal portion 24, and then the injection port is sealed. As a result, the power storage cell 20 is formed.

<Cell Stack Forming Step>

In the cell stack forming step, first, multiple power storage cells 20 are stacked so that the second surface 21a2 of the positive electrode current collector 21a and the second surface 22a2 of the negative electrode current collector 22a face each other. Thereafter, the outer peripheral portions 24a of the seal portions 24 of the power storage cells 20 adjacent to each other in the stacking direction are bonded to each other to integrate the power storage cells 20.

Next, the positive electrode cooling unit 40 is stacked on and fixed to the second surface 21a2 of the positive electrode current collector 21a of the positive electrode 21 disposed at the outermost position at one end in the stacking direction, such that the positive electrode cooling unit 40 is electrically connected to the second surface 21a2. Similarly, the negative electrode cooling unit 50 is stacked on and fixed to the second surface 22a2 of the negative electrode current collector 22a of the negative electrode 22 disposed at the outermost position at the other end in the stacking direction, such that the negative electrode cooling unit 50 is electrically connected to the second surface 22a2. As a result, the cell stack 30 is formed. Thereafter, the binding member 60 is attached to the cell stack 30. For example, after the binding plates 61 are disposed at the opposite ends of the cell stack 30 in the stacking direction, the binding plates 61 are fastened to each other by the fastening members 62.

Operation of the present embodiment will now be described.

The power storage device 10 of the present embodiment uses the liquid electrolyte that contains the ester compound to reduce viscosity. This increases the weight per unit area of the active material layer while suppressing an increase in the diffusion resistance of the charge carriers in the active material layer.

In addition, of the outer surfaces of the cell stack 30 formed by stacking the power storage cells 20 in series, the side surface in relation to the stacking direction is covered with the seal portion 24 (covering portion) made of plastic. This suppresses heat transfer between the liquid electrolyte in the cell stack 30 and the outside of the cell stack 30 through the side surface of the cell stack 30, and limits a heat transfer portion with the outside on the outer surface of the cell stack 30 to the terminal positive electrode current collector 21*a*' and the terminal negative electrode current collector 22*a*', which are located at the end faces in the stacking direction. In addition, the terminal positive electrode current collector 21*a*' and the negative electrode current collector 22*a*' are made of a high thermal conductivity material, and the positive electrode cooling unit 40 and the negative electrode cooling unit 50 for cooling the terminal positive electrode current collector 21*a*' and the terminal negative electrode current collector 22*a*' are provided.

When the power storage device 10 is used in a high-temperature environment, the plastic seal portion 24 (covering portion) suppresses the transfer of heat of the outside air to the liquid electrolyte in the cell stack 30. Even if the temperature of the liquid electrolyte rises due to the influence of the heat of the outside air, the heat is released to the outside through the terminal positive electrode current collector 21*a*' and the terminal negative electrode current collector 22*a*', which are made of a high thermal conductivity material, the positive electrode cooling unit 40, and the negative electrode cooling unit 50. Thus, an excessive temperature rise of the liquid electrolyte is suppressed, and the power storage device 10 is unlikely to be affected by heat of the outside air.

The present embodiment provides the following advantages.

(1) The power storage device 10 includes the power storage cells 20. Each power storage cell 20 includes the positive electrode 21, which includes the positive electrode current collector 21*a* and the positive electrode active material layer 21*b*, the negative electrode 22, which includes the negative electrode current collector 22*a* and the negative electrode active material layer 22*b*, the separator 23, which is disposed between the positive electrode active material layer 21*b* and the negative electrode active material layer 22*b*, and the accommodation chamber S, which is provided between the positive electrode 21 and the negative electrode 22 and accommodates the liquid electrolyte in a liquid-tight manner. The liquid electrolyte contains an ester compound.

The power storage device 10 includes the cell stack 30, in which the power storage cells 20 are stacked in series. The side surface of the cell stack 30 in relation to the stacking direction is covered with the seal portion 24 made of a plastic. The terminal positive electrode current collector 21*a*' and the terminal negative electrode current collector 22*a*', which are located in the outermost layer of the cell stack 30, are made of a high thermal conductivity material having a thermal conductivity greater than or equal to 100 W/(m·K). The power storage device 10 includes the positive electrode cooling unit 40, which cools the terminal positive electrode current collector 21*a*', and the negative electrode cooling unit 50, which cools the terminal negative electrode current collector 22*a*'.

The power storage device 10 according to the above-described configuration is less likely to be affected by heat of the outside air. It is thus possible to continuously suppress an increase in the diffusion resistance of charge carriers in the active material layer due to the ester compound contained in the liquid electrolyte even in a high-temperature environment.

(2) The weight per unit area of the positive electrode active material layer 21*b* is 55 mg/cm$^2$ or more. The weight per unit area of the negative electrode active material layer 22*b* is 25 mg/cm$^2$ or more.

The diffusion resistance of charge carriers such as lithium ions in the active material layer increases as the weight per unit area of the active material layer increases. Therefore, when the weight per unit area of the active material layer is large as described above, the above-described advantage (1) obtained by the liquid electrolyte containing the ester compound is more remarkable.

(3) The separators 23 are bonded to the positive electrode active material layer 21*b* and the negative electrode active material layer 22*b*.

The above-described configuration increases the efficiency of heat conduction between the positive electrode active material layer 21*b* and the negative electrode active material layer 22*b*, which face each other with the separator 23 interposed between them. As a result, heat is readily transferred in the stacking direction of the cell stack 30, and the heat in the cell stack 30 is efficiently transferred to the terminal positive electrode current collector 21*a*', the terminal negative electrode current collector 22*a*', the positive electrode cooling unit 40, and the negative electrode cooling unit 50, and released to the outside. Furthermore, since the separator 23 is bonded to the positive electrode active material layer 21*b* and the negative electrode active material layer 22*b*, it is possible to suppress an increase in the distance between the positive electrode active material layer 21*b* and the negative electrode active material layer 22*b* in the stacking direction during charging and discharging, and to suppress an increase in the resistance of the power storage cell 20.

(4) The positive electrode current collector 21*a* has a foil-shape with a thickness of to 0.05 mm, the weight per unit area of the positive electrode active material layer 21*b* is from 55 to 90 mg/cm$^2$, and the density of the positive electrode active material layer 21*b* is from 1.6 to 2.1 g/cm$^3$.

The above-described configuration includes the positive electrode active material layer 21*b* and thus increases the rigidity of the foil-shaped positive electrode current collector 21*a*. Therefore, when the internal pressure of the accommodation chamber S increases, it is possible to prevent the positive electrode 21 from being deformed in a warping manner and the contact area with the negative electrode current collector 22*a* of the adjacent power storage cell 20 from being reduced. As a result, it is possible to prevent a decrease in the heat conduction efficiency between the power storage cells 20 due to a decrease in the contact area.

(5) The negative electrode current collector 22*a* has a foil-shape with a thickness of to 0.02 mm, the weight per unit area of the negative electrode active material layer 22*b* is from 25 to 45 mg/cm$^2$, and the density of the negative electrode active material layer 22*b* is from 1.1 to 1.5 g/cm$^3$.

According to the above-described configuration, the same advantage as the above-described advantage (4) is achieved for the negative electrode 22.

(6) The areas of the terminal positive electrode current collector 21a' and the terminal negative electrode current collector 22a' located in the outermost layers of the cell stack 30 are from 1 m$^2$ to 2.5 m$^2$, and the thicknesses thereof are from 0.005 mm to 0.05 mm. That is, the terminal positive electrode current collector 21a' and the terminal negative electrode current collector 22a' are current collectors of which the thicknesses are significantly small with respect to their areas. Therefore, the amount of heat conduction from the positive electrode cooling unit 40 and the negative electrode cooling unit 50 can be increased, and the inside of the cell stack 30 is cooled efficiently.

(7) The areas of the general positive electrode current collectors and the general negative electrode current collectors are from 1 m$^2$ to 2.5 m$^2$, and the thicknesses thereof are from 0.005 mm to 0.05 mm. That is, the general positive electrode current collectors and the general negative electrode current collectors are current collectors of which the thicknesses are significantly small with respect to their areas. Therefore, the heat in the cell stack 30 is more efficiently transferred to the terminal positive electrode current collector 21a' and the terminal negative electrode current collector 22a'.

The above-described embodiment may be modified as follows. The above-described embodiment and the following modifications can be combined if the combined modifications remain technically consistent with each other.

In the above-described embodiments, the seal portions 24 form a covering portion that covers the side surface of the cell stack 30 in relation to the stacking direction. However, a covering portion may be provided separately from the seal portions 24 For example, the outer peripheral portions 24a of the seal portions 24 may be omitted, and a plastic layer covering the side surface of the cell stack 30 in relation to the stacking direction may be provided as the covering portion. The plastic that forms the plastic layer is the same as that of the seal portions 24. When the covering portion is provided separately from the seal portions 24, the plastic forming the covering portion may be the same as or different from the plastic forming the seal portions 24.

In the above-described embodiment, the accommodation chamber S is defined by the frame-shaped seal portion 24, the positive electrode 21, and the negative electrode 22. However, the structure that defines the accommodation chamber S is not limited to this. For example, the accommodation chamber S may be defined by the positive electrode 21, the negative electrode 22, and a plastic layer serving as a covering portion that covers the side surface of the cell stack 30 in relation to the stacking direction.

In this case, the plastic layer serving as the covering portion is bonded to each side surface of the positive electrode current collector 21a and the negative electrode current collector 22a. The side surface of the positive electrode current collector 21a is a side edge of the positive electrode current collector 21a, and is, for example, a surface orthogonal to the first surface 21a1 and the second surface 21a2 of the positive electrode current collector 21a, and the side surface of the negative electrode current collector 22a is a side edge of the negative electrode current collector 22a, and is, for example, a surface orthogonal to the first surface 22a1 and the second surface 22a2 of the negative electrode current collector 22a.

In this case, the, the seal portions 24 may be provided or may be omitted. When the seal portions 24 are provided, a seal portion may be provided that is bonded to neither the positive electrode current collector 21a nor the negative electrode current collector 22a, but is bonded to the plastic layer. Also, a seal portion may be provided that is bonded to the positive electrode current collector 21a and the plastic layer, but is not bonded to the negative electrode current collector 22a. Further, a seal portion may be provided that is bonded to the negative electrode current collector 22a and the plastic layer, but is not bonded to the positive electrode current collector 21a. Two or more types of these seal portions may be used in combination.

Only one of the terminal positive electrode current collector 21a' and the terminal negative electrode current collector 22a' may be made of a high thermal conductivity material, and the other may be made of the same material as the general positive electrode current collectors and the general negative electrode current collectors.

In the above-described embodiment, the positive electrode cooling unit 40 and the negative electrode cooling unit 50 are provided as cooling units, but one of the positive electrode cooling unit 40 and the negative electrode cooling unit 50 may be omitted. When only one of the terminal positive electrode current collector 21a' and the terminal negative electrode current collector 22a' is made of a high thermal conductivity material, a cooling unit is provided to cool the terminal positive electrode current collector 21a' or the terminal negative electrode current collector 22a' that is made of the high thermal conductivity material.

The separator 23 may be bonded to only one of the positive electrode 21 and the negative electrode 22, or may be bonded to neither the positive electrode 21 nor the negative electrode 22.

The shapes of the positive electrode current collector 21a and the positive electrode active material layer 21b in plan view are not particularly limited. The shape may be a polygonal shape such as a rectangular shape, or may be a circular shape or an elliptical shape. The same applies to the negative electrode current collector 22a and the negative electrode active material layer 22b.

The shape of the seal portion 24 in plan view is not particularly limited and may be a polygonal shape such as a rectangular shape or may be a circular shape or an elliptical shape.

The seal portion 24 may be formed by multiple members. For example, the seal portion 24 may be formed by two members that are the outer peripheral portion 24a and a portion other than the outer peripheral portion, and the seal portion 24 may be formed by welding the two members. Alternatively, the seal portion 24 may be formed by stacking multiple members in the stacking direction. Further, the seal portion 24 may be configured by two members that are the outer peripheral portion 24a and a portion other than the outer peripheral portion, and the portion other than the outer peripheral portion may be formed by stacking multiple members in the stacking direction.

In the above-described embodiment, the binding member 60 is provided for the cell stack 30, but the binding member 60 may be omitted.

Figure 2:
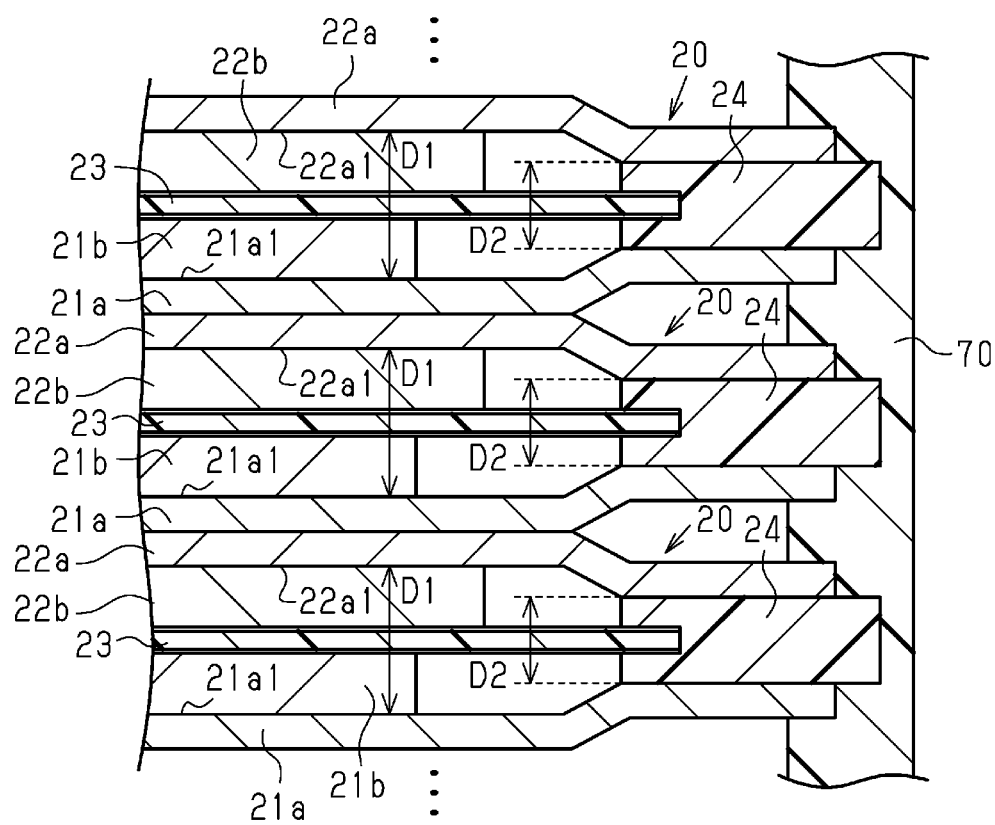
FIG. 2 is a partial cross-sectional view of a peripheral portion of a cell stack according to a modification.

As shown in FIG. 2, the distance between the first surface 21a1 of the positive electrode current collector 21a and the first surface 22a1 of the negative electrode current collector 22a in the power storage cell 20 may be different for each portion. In the stacking direction, the distance between the first surface 21a1 of the positive electrode current collector 21a and the first surface 22a1 of the negative electrode current collector 22*a* in a portion in which the positive electrode active material layer 21*b* and the negative electrode active material layer 22*b* face each other is defined as a first distance D1. The first distance D1 corresponds to the sum of the thicknesses of the positive electrode active material layer 21*b*, the negative electrode active material layer 22*b*, and the separator 23. In addition, in the stacking direction, the distance between the first surface 21*a*1 of the positive electrode current collector 21*a* and the first surface 22*a*1 of the negative electrode current collector 22*a* in a portion to which the seal portion 24 is bonded is defined as a second distance D2. The second distance D2 corresponds to the thickness of the seal portion 24 between the peripheral portion of the first surface 21*a*1 of the positive electrode current collector 21*a* and the peripheral portion of the first surface 22*a*1 of the negative electrode current collector 22*a*.

The second distance D2 is preferably less than the first distance D1, i.e., less than the thickness of the seal portion 24. In this case, in the facing region of the cell stack 30, it is possible to efficiently apply the binding load of the binding member 60 to a region in which the range where the positive electrode active material layer 21*b* is provided and the range where the negative electrode active material layer 22*b* is provided overlap with each other. On the other hand, if the second distance D2 is excessively small with respect to the first distance D1, stresses applied to the interfaces between the current collectors (the positive electrode current collector 21*a* and the negative electrode current collector 22*a*) and the seal portion 24 become large, and the seal portion 24 may be easily peeled off the positive electrode current collector 21*a* and the negative electrode current collector 22*a*.

From the above-described viewpoint, the first distance D1 and the second distance D2 preferably satisfy the relationship of $0.6D1 \leq D2 < D1$, more preferably satisfy the relationship of $0.7D1 \leq D2 \leq 0.95D1$, and still more preferably satisfy the relationship of $0.8D1 \leq D2 \leq 0.9D1$ When the second distance D2 is less than the first distance D1 as described above, a plastic layer 70 is provided as a covering portion that covers the side surface of the cell stack 30 in relation to the stacking direction, in addition to the seal portion 24.

A conductive layer in close contact with the positive electrode current collector 21*a* may be disposed between the positive electrode cooling unit 40 and the positive electrode current collector 21*a* in order to improve conductive contact between these members. Examples of the conductive layer include a layer containing carbon such as acetylene black or graphite and a layer having a hardness lower than that of the positive electrode current collector 21*a*, such as a plating layer containing gold or the like. A similar conductive layer may be disposed between the negative electrode cooling unit 50 and the negative electrode current collector 22*a*.

The number of the power storage cells 20 forming the power storage device 10 is not particularly limited. The number of the power storage cells 20 forming the power storage device 10 may be one.

The positive electrode active material layer 21*b* or the negative electrode active material layer 22*b* may be provided on the second surface 21*a*2 of the positive electrode current collector 21*a*. The positive electrode active material layer 21*b* or the negative electrode active material layer 22*b* may be provided on the second surface 22*a*2 of the negative electrode current collector 22*a*.

The electrodes may be bipolar electrodes in which the positive electrode current collector 21*a* and the negative electrode current collector 22*a* form one current collector.

Examples of current collectors for bipolar electrodes include stainless-steel foils (for example, SUS304, SUS316, SUS301, SUS304, and the like specified in HS G 4305: 2015), copper foil, aluminum foil, and nickel foil. Alternatively, a clad material of two or more kinds of metals such as copper and aluminum, a plated material of two or more kinds of metals such as copper and aluminum, or a current collector obtained by bonding two or more kinds of metal foils may be used. For example, when a copper-aluminum plated material having a copper layer and an aluminum layer is used as a current collector of bipolar electrodes, the aluminum layer can function as the positive electrode current collector 21*a*, and the copper layer can function as the negative electrode current collector 22*a*.

In the cell stack 30, the second surface 21*a*2 of the positive electrode current collector 21*a* and the second surface 22*a*2 of the negative electrode current collector 22*a*, which are contact portions of the power storage cells 20 adjacent to each other in the stacking direction, may be bonded to each other. Examples of the method of bonding the second surface 21*a*2 of the positive electrode current collector 21*a* and the second surface 22*a*2 of the negative electrode current collector 22*a* to each other include a method using an adhesive having conductivity.

Figure 3:
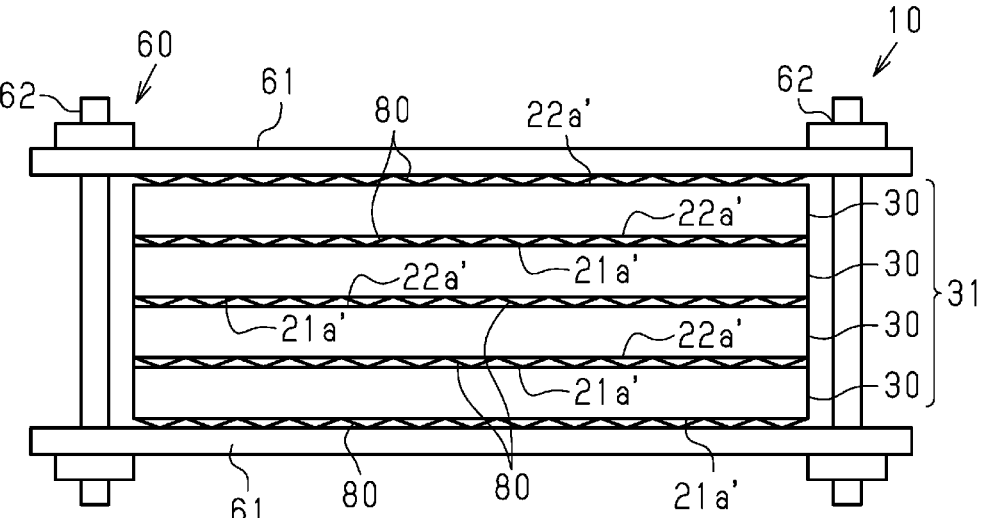
FIG. 3 is a cross-sectional view of a power storage device according to a modification.

As shown in FIG. 3, the power storage device 10 may be configured to include a cell stack assembly 31 formed by stacking multiple cell stacks 30. In the cell stack assembly 31, the cell stacks 30 are stacked such that the terminal positive electrode current collector 21*a*' and the terminal negative electrode current collector 22*a*' face each other. The cell stack assembly 31 includes, for example, one to eight cell stacks 30 that are stacked together. In the case of the power storage device 10 including the cell stack assembly 31, the binding member 60 is preferably configured to apply a binding load to the cell stack assembly 31.

In the power storage device 10 shown in FIG. 3, the positive electrode cooling unit 40 and the negative electrode cooling unit 50 are omitted. Multiple cooling units 80 are provided, with each cooling unit 80 located between each adjacent pair of the cell stacks 30 or between one of the cell stacks 30 and the corresponding one of the binding plates 61 of the binding member 60. The cooling unit 80 located between the cell stacks 30 cools both the terminal positive electrode current collector 21*a*' and the terminal negative electrode current collector 22*a*' facing each other with the cooling unit 80 interposed therebetween. The specific configuration of the cooling unit 80 is the same as that of the positive electrode cooling unit 40 and the negative electrode cooling unit 50 except that the cooling unit 80 is provided so as to be in contact with both the terminal positive electrode current collector 21*a*' and the terminal negative electrode current collector 22*a*' that face each other with the cooling unit 80 interposed therebetween. In the example shown in FIG. 3, the cooling units 80 are provided in all the gaps between all the cell stacks 30, but the cooling units 80 may be provided only some of the gaps between the cell stacks 30.

The cell stack assembly 31 may be configured such that the positive electrode cooling units 40 also functions as the negative electrode cooling units 50. For example, the cell stack assembly 31 is formed by stacking the cell stacks 30 from which the negative electrode cooling units 50 are omitted. The cell stacks 30 are stacked so that the positive electrode cooling unit 40 of one cell stack 30 is in contact with the terminal negative electrode current collector 22*a*' of another cell stack 30. In this case, the positive electrode cooling unit 40 also functions as a negative electrode cooling unit 50 that cools the terminal negative electrode current collector 22a' of the adjacent cell stack 30. Similarly, the cell stack assembly 31 may be configured such that the negative electrode cooling units 50 also function as the positive electrode cooling units 40.

The cell stack assembly 31 may include cell stacks 30 in which both the terminal positive electrode current collector 21a' and the terminal negative electrode current collector 22a' are made of a material other than a high thermal conductivity material.

EXAMPLES

The power storage device 10 was actually produced, and changes in temperature of the produced power storage device 10 during discharge were measured.

<Configuration of Power Storage Cell>

A power storage cell 20 having the following configuration was produced.

Material of Positive Electrode

Positive electrode current collector: Aluminum foil having thickness of 0.050 mm Positive electrode active material layer: Mixture of olivine-type lithium iron phosphate ($LiFePO_4$), acetylene black (AB), and polyvinylidene fluoride (PVdF)

Mass ratio of positive electrode active material layer: 90:5:5 ($LiFePO_4$:AB:PVdF)

Weight per unit area of positive electrode active material layer: 55.5 $mg/cm^2$ Density of positive electrode active material layer: 2 $g/cm^3$ Material of Negative Electrode Negative electrode current collector: Copper foil having thickness of 0.015 mm Negative electrode active material layer: Mixture of artificial graphite (C), carboxymethyl cellulose (CMC), and styrene-butadiene rubber (SBR).

Mass ratio of negative electrode active material layer: 94.8:0.8:4.4 (C:CMC:SBR)

Weight per unit area of negative electrode active material layer: 26.5 $mg/cm^2$ Density of negative electrode active material layer: 1.3 $mg/cm^2$ Other Materials Separator: Porous sheet having thickness of 18 μm with ceramic layer Seal portion: Acid-modified polyethylene Liquid electrolyte: LiN $(FSO_2)_2$ was dissolved in mixed solution of ethylene carbonate and methyl propionate at volumetric ratio of 15:85 so as to be 1.2 M, and vinylene carbonate and lithium difluoro oxalate borate (LiDFOB) were added to be 5.7 mass % and 1 mass %, respectively.

Size of Power Storage Cell

Area of positive electrode active material layer in plan view: 780 mm×1024 mm

Thickness of positive electrode active material layer: 277.5 μm

Area of negative electrode active material layer in plan view: 822 mm×1055 mm

Thickness of negative electrode active material layer: 203.8 μm

Volume of accommodation chamber: 29.3 $cm^3$

<Cell Stack and Power Storage Device>

Twenty four of the produced power storage cells 20 were stacked in series to produce one cell stack 30. The power storage device 10 was produced using the produced cell stacks 30.

As shown in FIG. 3, the power storage device 10 had a structure in which four cell stacks 30 were stacked. The power storage device 10 was provided with multiple cooling units 80, with each cooling unit 80 located between each adjacent pair of the cell stacks 30 or between one of the cell stacks 30 at the opposite ends in the stacking direction and the corresponding binding member 60. Aluminum plates were used for the cooling units 80. Hereinafter, the cooling unit 80 positioned between the cell stacks 30 will be referred to as an inner cooling unit, and the cooling unit 80 positioned between the cell stack 30 and the binding member 60 will be referred to as an outer cooling unit.

The produced power storage device 10 was provided with first temperature sensors and second temperature sensors for measuring temperatures of the cell stacks 30. Each first temperature sensor was a thermistor capable of measuring the temperature of a surface of each cell stack 30. Specifically, the first temperature sensor measured the surface that faced the inner cooling unit. Each second temperature sensor was a thermistor capable of measuring the temperature of a surface of each of the cell stacks 30 located at the opposite ends in the stacking direction. Specifically, the second temperature sensor measured the surface that faced the outer cooling unit.

<Temperature Measurement of Power Storage Device>

The produced power storage device 10 was charged with a charging current of 3.78 A until any of the power storage cells 20 reached 3.75 V. Thereafter, the charged power storage device 10 was left at a temperature of 25° C. to adjust the temperature of the power storage device 10 such that the temperature measured by each first temperature sensor and each second temperature sensor was 25° C. Next, at a temperature of 25° C., the charged power storage device 10 was discharged at a discharge current of 40 A with a starting SOC of 100% until the discharge capacity reached 50 Ah. The temperatures of several parts of the cell stack 30 of the power storage device 10 during discharging were measured by the first temperature sensors and the second temperature sensors. The results are shown in FIG. 4.

Figure 4:
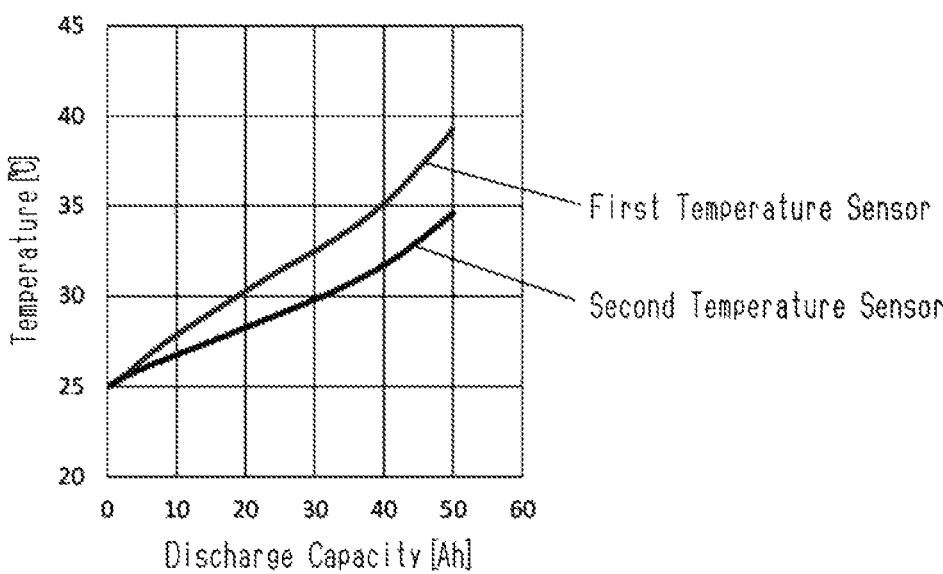
FIG. 4 is a graph showing changes in temperature of the cell stack during discharge.

Although only one of the measurement results obtained by the first temperature sensors is shown in the graph of FIG. 4, all the measurement results obtained by the first temperature sensors were the same as the measurement results obtained by the first temperature sensor shown in the graph. Also, although only one of the measurement results obtained by the second temperature sensors is shown in the graph of FIG. 4, all the measurement results obtained by the second temperature sensors were the same as the measurement results obtained by the second temperature sensor shown in the graph.

As shown in FIG. 4, the temperature of each cell stack 30 of the power storage device 10 gradually increased with the progress of discharging. As for the temperature of the power storage device 10 during discharging, the temperature inside power storage device 10 measured by the first temperature sensor was higher than the temperature outside power storage device 10 measured by the second temperature sensor.

As described above, although the temperature of the power storage device 10 increased with discharging, neither the temperature inside power storage device 10 measured by the first temperature sensor nor the temperature outside power storage device measured by the second temperature sensor exceeded 40° C. These results demonstrate that the temperature rise of the cell stack 30 was suppressed by providing the cooling units 80.

REFERENCE SIGNS LIST

S . . . Accommodation Chamber; 10 . . . Power Storage Device; 20 . . . Power Storage Cell; 21 . . . Positive Electrode; 21*a* . . . Positive Electrode Current Collector; 21*a*' . . . Terminal Positive Electrode Current Collector; 21*b* . . . Positive Electrode Active Material Layer; 22 . . . Negative Electrode; 22*a* . . . Negative Electrode Current Collector; 22*a*' . . . Terminal Negative Electrode Current Collector; 22*b* . . . Negative Electrode Active Material Layer; 23 . . . Separator; 24 . . . Seal Portion; 30 . . . Cell Stack; 40 . . . Positive Electrode Cooling Unit; 50 . . . Negative Electrode Cooling Unit

The invention claimed is:

1. A power storage device, comprising a cell stack in which power storage cells are stacked in series, wherein each power storage cell includes:

a positive electrode, in which a positive electrode active material layer is bonded to a first surface of a positive electrode current collector;

a negative electrode, in which a negative electrode active material layer is bonded to a first surface of a negative electrode current collector, the negative electrode active material layer being disposed to face the positive electrode active material layer of the positive electrode;

a separator disposed between the positive electrode active material layer and the negative electrode active material layer;

a seal portion disposed between a first surface of the positive electrode current collector of the positive electrode and a first surface of the negative electrode current collector of the negative electrode, and on an outer side of the positive electrode active material layer and the negative electrode active material layer, and bonded to both the positive electrode current collector and the negative electrode current collector; and an accommodation chamber defined by the seal portion, the positive electrode and the negative electrode and accommodates a liquid electrolyte in a liquid-tight manner, wherein the liquid electrolyte is a liquid electrolyte containing an ester compound and a nonaqueous solvent, the ester compound is at least one of methyl acetate, ethyl acetate, or methyl propionate, the positive electrode current collector and the negative electrode current collector located as outermost layers of the cell stack are terminal current collectors, at least one of the terminal current collectors is made of a high thermal conductivity material having a thermal conductivity greater than or equal to 100 W/(m·K), and the power storage device comprises a cooling unit that cools the at least one terminal current collector made of the high thermal conductivity material.

2. The power storage device according to claim 1, wherein at least one of the following conditions is met: a weight per unit area of the positive electrode active material layer is greater than or equal to 55 mg/cm², and a weight per unit area of the negative electrode active material layer is greater than or equal to 25 mg/cm².

3. The power storage device according to claim 1, wherein the separator is bonded to the positive electrode active material layer and the negative electrode active material layer.

4. The power storage device according to claim 1, further comprising a conductive layer disposed between the cooling unit and the at least one terminal current collector.

5. The power storage device according to claim 1, wherein the ester compound is contained in an amount of 30 to 95% by volume based on the total volume of the nonaqueous solvent in the liquid electrolyte.

6. The power storage device according to claim 1, wherein a second surface of the positive electrode current collector and a second surface of the negative electrode current collector, which are contact portions of the power storage cells adjacent to each other in a stacking direction, are bonded via an adhesive having conductivity.

7. The power storage device according to claim 1, wherein each separator has an adhesive layer on at least one surface.

8. The power storage device according to claim 1, wherein the seal portion includes an outer peripheral portion, which extends outward beyond each edge portion of the positive electrode current collector and the negative electrode current collector, the outer peripheral portion protrudes in a direction orthogonal to a stacking direction from each edge portion of the positive electrode current collector and the negative electrode current collector, and the power storage cells adjacent to each other in the stacking direction are integrated by bonding the outer peripheral portions of the seal portions to each other.

9. The power storage device according to claim 1, wherein the liquid electrolyte is in free liquid form.

10. The power storage device according to claim 1, wherein the liquid electrolyte has a viscosity at 25° C. is 7 mPa·s or less.

\* \* \* \* \*